United States Patent [19]
Van Der Valk

[11] 3,912,864
[45] Oct. 14, 1975

[54] CIRCUIT ARRANGEMENT FOR SUPPLYING PULSES HAVING A DEFINED PULSE EDGE DURATION IN A TELEVISION IMAGE SIGNAL

[75] Inventor: Nicolaas Jan Leendert Van Der Valk, Eindhoven, Netherlands

[73] Assignee: U.S. Philips Corporation, New York, N.Y.

[22] Filed: Aug. 3, 1973

[21] Appl. No.: 385,605

[30] Foreign Application Priority Data

Aug. 18, 1972 Netherlands ....................... 7211380

[52] U.S. Cl. ........................ 178/69.5 TV; 178/7.3 S
[51] Int. Cl.[2] ........................ H04L 7/00; H04N 3/16
[58] Field of Search ..... 178/69.5 TV, 69.5 R, 7.3 S, 178/7.5 S; 179/15 BS; 328/63

[56] References Cited

UNITED STATES PATENTS 3,297,952 1/1967 Thylander ............................ 328/63
3,337,688 8/1967 Hiatt, Jr. ..................... 178/69.5 TV
3,454,719 7/1969 Horstmann et al. .......... 178/69.5 TV
3,492,424 1/1970 Hare et al. ................... 178/69.5 TV
3,699,256 10/1972 Roth ................................ 178/7.3 S

*Primary Examiner*—Malcolm A. Morrison
*Assistant Examiner*—Errol A. Krass
*Attorney, Agent, or Firm*—Frank R. Trifari; Henry I. Steckler

[57] ABSTRACT

A circuit arrangement for supplying line blanking or line synchronizing pulses having a defined pulse edge duration in a television image signal, formed with an amplifier circuit to which the image signal is applied and the output of which is connected to a signal comparator circuit to which also a signal having pulses of the defined edge duration is applied. If the output signal of the amplifier circuit exceeds the said signal with the pulses due to the supply of the image signal, this would be prevented by the amplification being reduced by the signal comparator circuit.

9 Claims, 2 Drawing Figures

Figure 1:
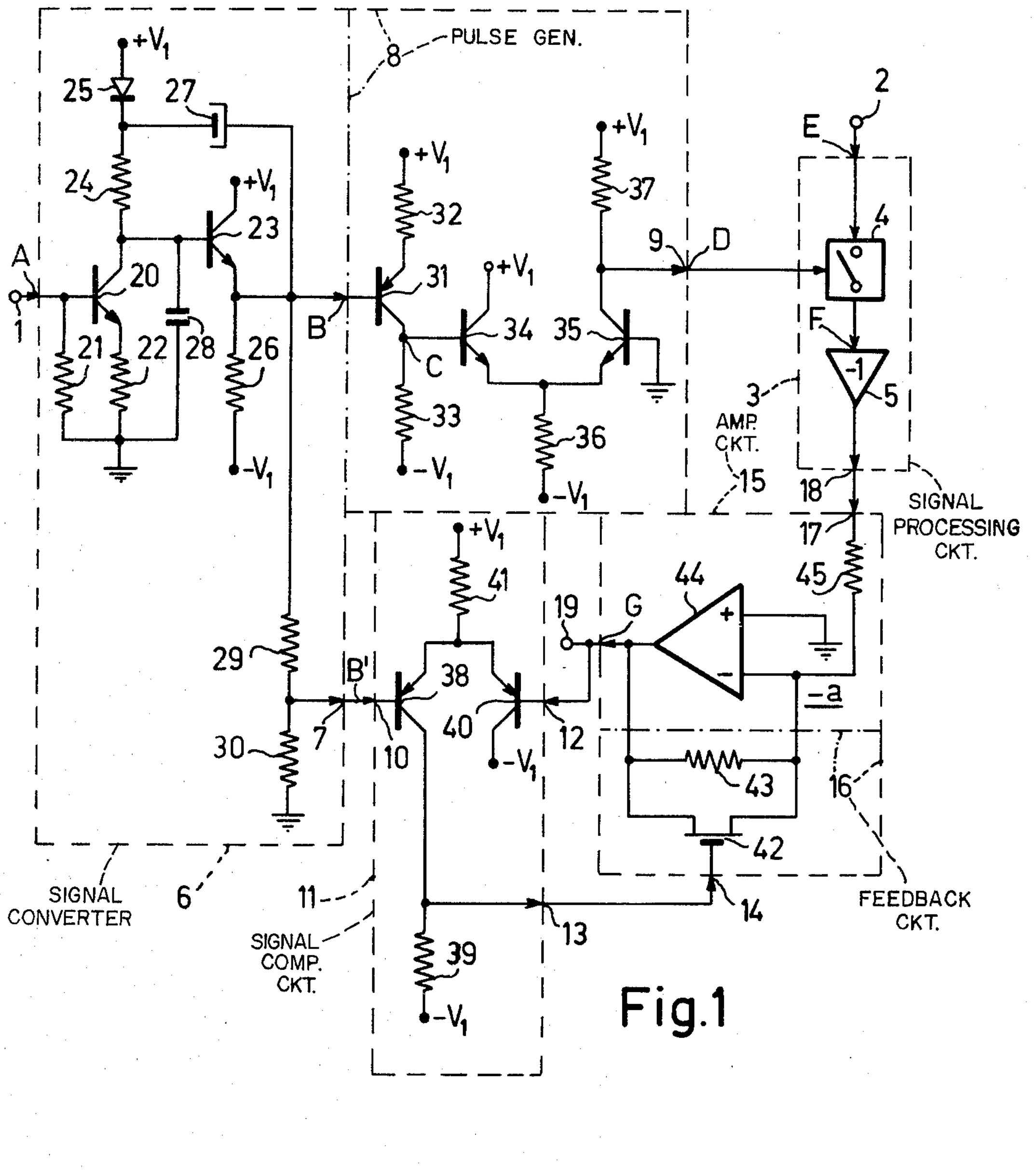

CIRCUIT ARRANGEMENT FOR SUPPLYING PULSES HAVING A DEFINED PULSE EDGE DURATION IN A TELEVISION IMAGE SIGNAL

The invention relates to a circuit arrangement for supplying pulses having a defined pulse edge duration in a television image signal.

In television the image signal is supplied in periodically occurring line periods by a pick-up device in a television camera. The video information or the picture contents are given in a large part of one line period and the remaining smaller part is used for the line flyback to the beginning of a subsequent line. During the line flyback period noise and frequently large interference signal peaks occur in the image signal. To remove the unwanted noise and interference signal peaks and for accurate determination of the beginning and end of the line scan with the video information each television system uses a line blanking pulse. The line blanking signal occurring in each television system with the periodically occurring pulses has the result on the one hand that the removed interference signal peaks do not affect the further signal processing in the camera and on the other hand a line synchronising pulse and the burst signal in colour television can be added to the image signal during the line blanking period for transmission to a display apparatus. In a video signal thus built up the various instants are fixed in accordance with television standards for which a small front porch or large back poroh is determined by the time difference between the leading edges of the line blanking and line synchronising pulse or between the trailing edges of the synchronizing and blanking pulses, respectively, while the burst signal is provided in a determined manner on said back porch.

The normally performed insertion of a line blanking pulse in the image signal is comparable to the opening of a switch through which the image signal is passed during the remaining line period. In practice a pulse leading edge in the passed image signal is associated therewith, which edge has a steepness determined by the interruption rate of the electronic switch. In practice periods of approximately 10 ns may occur for the edge duration. This is in itself favourable for removing the said interference signal peaks so as to cause the switch to open as fast as possible in order that these peaks cannot exert any influence during opening. When the switch is closed the entire electronic circuit and the instantaneously provided image signal value mainly determine the duration of the pulse trailing edge. In practice periods of 15 to 20 ns are found to occur.

In the RTMA-television standard the edge periods of the line synchronizing and blanking pulses have been taken into account for the determination of the instants and these periods are to be shorter than or equal to four thousandths of one line period, which corresponds to approximately 250 ns. The edge duration of the blanking pulse is given for a standardized signal amplitude between a minimum value as a black level and a maximum value as the so-called peak-white value while the edge duration is taken from 1/10 to 9/10 of the amplitude. The same applies to a standardized amplitude of the line synchronizing pulses.

The given practical values amply satisfy the described television standard. Apart therefrom, however, there is the drawback that the edge duration occurring in practice is actually too short. The result is that signal processing circuits following the said switch may have to process a steep, high leading edge of, for example, the blanking pulse, which adversely affects the signal processing through normal and parasitic capacitive couplings. When the peak white value also occurs in the image signal at the commencement of the line scan, the steep, high trailing edge of the line blanking pulse will continue to rise to higher values and has an oscillation with all attendant unpleasant results for signal processing and display.

The described steep signal edges are particularly fatal for the satisfactory operation of signal filters to be used and for signal processing with the aid of video tape recording equipment.

In the CCIR television standard it has been prescribed to adjust the pulse edge duration of the line synchronizing and blanking pulses between 200 and 400 ns.

An object of the invention is to provide a circuit arrangement which supplies a line blanking or line synchronizing pulse having a defined pulse edge duration in a television image signal, independent of the specific signal edges determined by the components of the circuit arrangement. To this end the circuit arrangement according to the invention is characterized in that it is provided with an amplifier circuit having an input for the supply of the image signal and an output which is connected to an input of a signal comparator circuit having a further input for the supply of a signal having pulses of the defined pulse edge duration, the output of said signal comparator circuit being connected to a control input of the amplifier circuit for reducing its amplification if the output signal thereof exceeds the said signal with the pulses while the image signal is being supplied.

Figure 2:
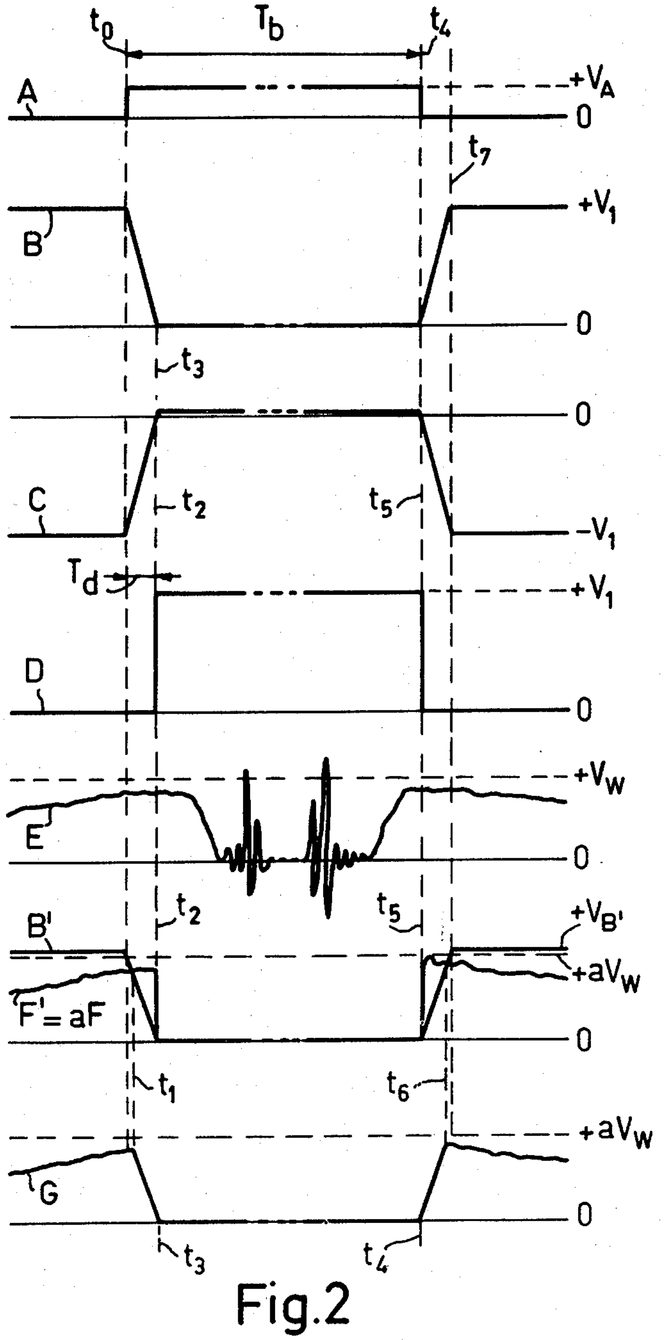

The invention will be described in greater detail with reference to the following Figures as examples in which FIG. 1 shows an embodiment of a circuit arrangement according to the invention suitable for line blanking pulse introduction in an image signal and FIG. 2 shows some signals occurring in the circuit arrangement of FIG. 1 for the purpose of illustrating its operation.

In the circuit arrangement according to FIG. 1 an input is denoted by 1 to which a signal A is applied. In FIG. 2 the signal A is plotted as a function of time with a pulse having a duration of $T_b$. The signal A is a line blanking signal in which a pulse occurs during each line period of, for example, 63.55 or 64 $\mu$s and in which only one of the periodically occurring line blanking pulses is shown in FIG. 2. The line periods are given as prescribed by the RTMA- or CCIR-standard. The value of the pulse duration $T_b$ is the value described by a television standard, but as will be apparent, the pulse occurs slightly shifted with respect to time. The pulse shown in signal A having a duration of $T_b$ of approximately 11 to 12 $\mu$s has a leading edge at an instant $t_0$ starting from the ground potential 0 to a voltage value of $+V_A$ of, for example, 1.5 V. At an instant $t_4$ the trailing edge occurs. In the signal A shown in FIG. 2 the duration of the edges at the instants $t_0$ and $t_4$ has not been taken into account, but for the purpose of illustration the edge periods are, for example approximately 10 ns. In the signals A to G shown in FIG. 2 some instants successively occurring are denoted by $t_0, t_1, \ldots, {}_7$.

Generally the signal A shown in FIG. 2 with a pulse slightly shifted with respect to time is used for inserting the line blanking pulses in a television image signal. In FIG. 2 a signal E denotes a possible image signal provided by a pick-up device in a television camera. The reference $+V_W$ denotes the so-called peakwhite value in the signal E which in a standardised form is, for example, 200 mV while the black level is at the ground potential 0. The signal E of FIG. 2 is shown in the circuit arrangement according to FIG. 1 at an input 2 thereof which input 2 is connected to a signal processing circuit 3. The signal processing circuit 3 is diagrammatically shown with an on-off switch 4 connected to the input 2 and a subsequent (inverting) amplifier 5. In the circuit arrangement 3 it is of importance that a line blanking pulse, to be further described, instead of that in the signal A operates the switch 4. The electronic switch 4 will therefore pass an image signal in which a (modified) line blanking pulse occurs with non-defined steep edges having a duration of 10 to 20 ns as occurs in practice.

According to the invention the circuit arrangement according to FIG. 1 has its input 1 connected to a signal converter 6 which derives a signal B and B′ shown in FIG. 2 from the signal A applied to this converter, which signal B′ is available at the first output 7. The signal converter 6 includes a pulse generator 8 which under the supply of the signal B through conversion to a signal C applies a signal D to a second output 9 for the control of the switch 4 in the signal processing circuit 3. The line blanking pulse shown in signal D in FIG. 2 is the modified pulse having the non-defined steep edges which occur at slightly shifted instants ($t_2$ and $t_5$) with respect to the edges in the signal A ($t_0$ and $t_4$).

The output 7 of the signal converter 6 is connected to an input 10 of a signal comparator circuit 11 of which a second input denoted by 12 receives the signal G. An output 13 of the signal comparator circuit 11 is connected to a control input 14 of a feedback circuit 16 incorporated in an amplifier circuit 15. An input 17 of the amplifier circuit 15 is connected to an output 18 of the signal processing circuit 3 while an output 19 of the amplifier circuit 15 conveys the signal G. The output 19 is also the output of the circuit arrangement of FIG. 1 according to the invention which with the signal G of FIG. 2 supplies a television image signal including a line blanking pulse having a defined pulse edge duration.

To explain the operation of the circuit arrangement according to FIG. 1 the following applies: the input 1 is connected in the signal converter 6 to the base of a transistor 20 while the base and the emitter are connected to ground through resistors 21 and 22, respectively. The collector of the transistor 20 is directly connected to the base of a transistor 23 and through a resistor 24 to the cathode of a diode 25 whose anode is connected to a voltage $+V_1$. The collector of the transistor 23 is directly connected to the voltage $+V_1$ and the emitter is connected to a voltage $-V_1$ through a resistor 26. The emitter of the transistor 23 is connected to a terminal of an electrolytic capacitor 27 the other terminal of which is connected to the cathode of the diode 25. A capacitor 28 is provided between the collector of the transistor 20 and ground. For the capacitor 28 the components 20 to 27 are active in a manner to be described hereinafter as a current source 20–27 which under the control of the signal A applies a constant current thereto within a given period. The emitter of the transistor 23 therefore conveys the signal B shown in FIG. 2 which, via two resistors 29 and 30 series-arranged to ground produces the signal B′ at its junction which signal becomes available at the output 7 connected to said junction.

To explain the operation of the current source 20–27 the starting point is that the capacitor 27 having a large capacitance conveys a given bias which is adjusted at a value of slightly less than $+V_1 - V_{BE}$. The voltage $V_{BE}$ is the voltage drop of, for example, 0.7 V which occurs in the conducting condition across the base-emitter diode of a transistor 23 or across the anode-cathode junction of a diode 25. FIG. 2 shows that before the instant $t_0$ the signal A has the ground potential and the voltage $+V_1$ of, for example, 6 V occurs in the signal B. The transistor 20 of FIG. 1 is then cut off and the voltage $+V_1$ plus the voltage $V_{BE}$ occurring across its base emitter diode is present at the base of the conducting transistor 23 which voltage $+V_1 + V_{BE}$ is also present across the capacitor 28. The bias across the capacitor 27 added to the voltage $+V_1$ at the emitter of the transistor 23 produces a current through the resistor 24, the diode 25 being blocked, which current flows through the base-collector diode of the transistor 23 (with a voltage drop equal to the said $V_{BE}$) to the voltage $+V_1$. At the instant $t_0$ the voltage $+V_A$ occurs in the signal A of FIG. 2 and the transistor 20 is rendered conducting while a constant current $i_{22}$ starts to flow through the resistor 22 under the control of the constant voltage $+V_A$. After transistor 20 has been rendered conducting, the resistor 24 conveys a current denoted by $i_{24}$ immediately after the instant $t_0$. The operating point of the transistor 20 is adjusted in such a manner with the aid of the resistors 21 and 22 that immediately after the instant $t_0$ the voltage $+V_A$ at the base produces a current $i_{22} = 2\ i_{24}$. The result is that the capacitor 28 is discharged through the transistor 20 with a current having a value of once $i_{24}$. The voltage decrease across the capacitor 28 thus caused also occurs at the emitter of the (emitter follower) transistor 23, which voltage decrease is passed through the capacitor 27 to the junction of the resistor 24 and the blocked diode 25. It is found that the voltage decrease at the junction of the resistor 24 and the transistor 20 is accompanied by an equally large decrease at the junction with the diode 25 so that the current $i_{24}$ flowing through the resistor 24 remains constant. The result is that the capacitor 28 is discharged with a constant current of once $i_{24}$. The discharge of capacitor 28 may continue until the ground potential will occur at the emitter of the transistor 23 because the associated voltage $V_{BE}$ at its base is equal to the voltage drop across the resistor 22 and the transistor 20 associated with the current $i_{22}$.

The discharge of the capacitor 28 with the constant current of the current source 20–27 produces the linear edge shown in the signal B of FIG. 2 between the instants $t_0$ and $t_3$. Since the said assumed bias across the capacitor 27 has a slightly lower value than $+V_1 - V_{BE}$, while at the instant $t_0$ the cathode of the diode 25 receives a voltage which is slightly less than $+2V_1 - V_{BE}$, the voltage at the cathode of the diode 25 will tend to become a little bit lower than $+V_1 - V_{BE}$ just before the instant $t_3$ which is prevented by the diode 25 becoming conducting. The voltage across the capacitor 27 is then brought to $+V_1 - V_{BE}$. The constant voltage $+V_A$ at the base of the transistor 20 maintains the current $i_{22}$ constant after the instant $t_3$ and hence the current $i_{24}$ which is equal thereto.

In the signal A of FIG. 2 it has been shown that the voltage $+V_A$ at the instant $t_4$ at the end of the line blanking period $T_b$ drops out. As a result the transistor 20 is cut off. The current $i_{24}$ flowing through the resistor 24 will then start to charge the capacitor 28 and the voltage increase is fed back through the transistor 23 and the capacitor 27 to the junction of the resistor 24 and the diode 25 which is immediately blocked. As described with reference to the discharge the feedback results in the charge current $i_{24}$ being constant. The charge current is equal to the discharge current because the condition $i_{22} = 2\ i_{24}$ is satisfied for the discharge. Charging of the capacitor 28 will therefore occupy the duration from $t_4$ to $t_7$ for the signal B of FIG. 2 which duration is equal to the duration $t_0$ to $t_3$. Immediately after the instant $t_7$ the emitter of the transistor 23 conveys the voltage $+V_1$ to which the voltage across capacitor 27 of $+V_1 - V_{BE}$ is added and the voltage $+2V_1 - V_{BE}$ is impressed on the cathode of the diode 25. As described before the instant $_0$ the current $i_{24}$ continues to flow through the base collector diode of the transistor 23. As a result the voltage across capacitor 27 slightly decreases to a subsequent periodically occurring instant $t_0$. In the manner described subsequent periodically occurring pulses (not shown) in the signal A produce associated pulse edges in the signal B as shown in FIG. 2.

The signal B′ which together with a signal $F' = aF$ to be further described is plotted in FIG. 2 is obtained through the potential divider consisting of the resistors 29 and 30. The signal B′ produces a variation between the ground potential 0 and a voltage $+V_B$.

The signal converter 6 includes a pulse generator 8 for deriving the signal D from the signal B. To this end the emitter of the transistor 23 is connected to the base of a transistor 31 whose emitter and collector are connected through resistors 32 and 33 to the voltages $+V_1$ and $-V_1$, respectively. The collector of the transistor 31 thus conveys the signal C shown in FIG. 2 having a voltage of $-V_1$ in the cut-off condition of the transistor 31 and having a positive voltage of 100 *m*V between the instants $t_3$ and $t_4$ in its maximum conducting condition. The pulse generator 8 is formed with a threshold circuit built up from two transistors 34 and 35 whose interconnected emitters are connected through a resistor 36 to the voltage $-V_1$ while the collectors of the transistors 34 and 35 are connected directly and through a resistor 37, respectively, to the voltage $+V_1$. Since the base of the transistor 35 is connected to ground, the signal C applied to the base of the transistor 34, upon exceeding the ground potential 0 from the negative voltage, will cause the transistor 35 conducting before that instant, to be cut off. This will be effected at the instant $t_2$ which lies several ns (5 to 10) before the instant $t_3$. Thus at the instant $t_5$, which lies several ns after the instant $t_4$, the transistor 35 will become conducting again. The result is that the collector of the transistor 35 in the threshold circuit (34–37) conveys the signal D shown in FIG. 2 which becomes available at the output 9. By the choice of the resistors 36 and 37 it has been achieved that before the instant $t_2$ and after the instant $t_5$ the collector of the transistor 35 conveys the ground potential as is shown in FIG. 2; this is, however, not essential.

The signal D at the output 9 is applied as a line blanking signal to the signal processing circuit 3 and controls the electronic switch 4 in the manner as shown in FIG. 1. Apart from the amplitude shown the signal D differs from the signal A in a leading edge occurring one duration $T_d$ later ($t_2$ with respect to $t_0$) and a trailing edge occurring several ns later ($t_5$ with respect to $t_4$). The duration $T_d (= t_2 - t_0 \approx t_3 - t_0)$ is deliberately chosen and is, for example, 300 ns in a television system according to the CCIR standard and approximately 200 ns in the RTMA standard. The duration $T_d$ is substantially determined by the discharge of the capacitor 28 with the aid of the current source (20–27) as described for the signal B. The delay of the leading edge in the signal D will be found to be desirable for the purpose to be described with reference to the signal G shown.

Under the control of the signal D the on-off switch 4 passes part of the signal E applied thereto. The signal E shown in FIG. 2 shows that the video information obtained from a pick-up device not shown is also present in the duration $T_b$. What is more noise and interference signal peaks associated with the line flyback occur during the period $T_b$ in the signal E. In the signal E the voltage $+V_W$ denotes the peakwhite value which has, for example, the standardized value of 200 mV. The signal passed by the switch 4 and denoted by F is not shown as such in FIG. 2 but an amplified signal $F' = aF$ corresponding thereto is shown. In a corresponding manner the peakwhite value $+ aV_W$ is plotted.

The signal $F' = aF$ shown in FIG. 2 would occur at the output 19 in FIG. 1 if the signal comparator circuit 11 were not active. In fact the amplifier 5 supplies the signal F of reversed polarity with the factor (−1) which signal is amplified by the amplifier circuit 15 including the feedback circuit 16 (which is then considered to be non-variable with a factor ($-a$). The signal $F' = aF$ of FIG. 2 has non-defined steep edges of 10 to 20 ns at the instants $t_2$ and $t_5$. The leading edge at the instant $t_2$ does not provide any difficulties locally but in the further signal processing they will certainly occur especially when using filters. It has been shown at the trailing edge at the instant $t_5$ that a continuing use and a signal oscillation occurs which is unwanted for display, while also this edge will be too steep for a further satisfactory signal processing.

According to the invention the signal G instead of the signal $F' = aF$ shown in FIG. 2 will be applied to the output 19. To this end the signal B′ is applied to the signal comparator circuit 11, namely to the base of a transistor 38 whose collector is connected through a resistor 39 to the voltage $-V_1$. The emitter of the transistor 38 is connected to that of a transistor 40 and both are connected through a resistor 41 to the voltage $+V_1$. The base of the transistor 40 is connected to the output 19 and the collector is connected to the voltage $-V_1$. The junction of the resistor 39 and the transistor 38 is connected to the output 13 which is connected through the control input 14 to a gate electrode of a transistor 42 incorporated in the feedback circuit 16 of the amplifier circuit 15. The transistor 42 is of the type having an isolated gate electrode and it has a source and a drain electrode which are arranged in parallel with a resistor 43 between the output and an inverting input of an operational amplifier 44. The output of the amplifier 44 constitutes the output 19. The non-inverting input of the amplifier 44 is connected to ground while the inverting input is connected through a resistor 45 to the input. 17.

For the operation of the combination of the signal comparator circuit 11 and the amplifier circuit 15 the following applies. In the cut-off condition the transistor 38 causes the gate electrode of the transistor 42 to convey the voltage $-V_1$ and consequently the transistor 42 is cut off. When transistor 42 is cut off, which corresponds to an infinitely large resistance, the amplification ($a$) of the amplifier circuit 15 is equal to the ratio of the resistances of the resistors 43 and 45. Taking the signal supply to the inverting input of the amplifier 44 into account, the amplification of the circuit 15 thus is ($-a$). The cut-off condition of the transistor 38 and the associated amplification ($-a$) of the amplifier circuit 15 occur when the voltage at the base of the transistor 38 is higher than that at the base of transistor 40. FIG. 2 shows that the signal B' conveys the voltage $+V_B$ before the instant $t_0$ and after the instant $t_7$ which voltage is higher than the peakwhite value $+aV_W$ which may occur at the output 19. For the purpose of illustration there applies that for a voltage of $V_W = 200$ mV and $a = 7.5$ the voltage $V_B$ is chosen to be 1.6 V. It follows that before the instant $t_0$ and after the instant $t_7$ the signal comparator circuit 11 is not active so that the signal G at the output 19 is then equal to the described signal $F' = aF$. In this case the voltage at the junction of the resistor 41 and the transistor 40 follows without any further consequences the instantaneous voltage values of the signal G at the output 19, but this with a voltage which is $+V_{BE}$ higher.

FIG. 2 shows that at the instant $t_1$ the voltage in the signal B' has become equal to that in the signal $F' = aF$, that is to say, the voltages at the bases of the transistors 38 and 40 have become equal. Consequently, transistor 38 becomes conducting. Immediately after the instant $t_1$ the voltage at the base of the transistor 38 further decreases while that at the base of the transistor 40 would remain approximately equal under the influence of the signal ($-F$) applied to the input 17. However, this does not happen because the transistor 38 will start to convey more current resulting in a less negative voltage at the output 13, and the variable resistor (transistor 42) will have an equally smaller value and hence also the amplification of the amplifier circuit 15 so that the same voltage occurs at the output 19 as is applied to the base of the transistor 38. The signal comparator circuit 11 applies such a large voltage to the output 13 that the amplification of the amplifier circuit 15 is reduced until the voltage in the signal G at the output 19 cannot be higher than that in the signal B'.

In the manner described the amplification of the amplifier circuit 15 is still further reduced from the instant $t_1$ to the instant $t_2 \approx t_3$ so that an edge is obtained in the signal G which is determined by the signal B'. If instead of the substantially constant voltage shown in the signal $F' = aF$ between the instants $t_1$ and $t_2$ a voltage decrease occurs to below the instanteneous voltage in the signal B' this lower value likewise occurs in the signal G because then the signal comparator circuit 11 switches off the transistor 42.

It follows from the foregoing that independent of the signal supply to the input 17 the voltage at the output 19 can never exceed the voltage instantaneously applied to the input 10. It follows from the signals B' and $F' = aF$ shown in FIG. 2 that as from the instant $t_4 \approx t_5$ to the instant $t_6$ the edge in the signal G must be equal to that in the signal B'.

It likewise follows that between the instants $t_3$ and $t_4$ of the signal G, with the ground potential present in the signal B' and at the non-inverting input of the amplifier 44, the amplification of the amplifier circuit 15 is reduced to zero. If for some reason or other a negative going interference pulse occurred at the input 17 during the period $t_3$ to $t_4$, it would not occur as a positive going pulse at the output 19 due to the zero amplification of the amplifier circuit 15. Thus the switch 4 in the signal processing circuit 3 need not be used first for a line blanking pulse introduction in the signal E, but the signal E can be directly applied through the inverting amplifier 5 to the input 17. Since the zero amplification of the amplifier circuit 15 is only active for the positive going interference signal peaks in the signal E and not for the negative going peaks present therein, they are firstly to be removed through a clamping circuit. In that case the amplification is to be reduced to exactly zero in connection with the height of the positive going interference signal peaks.

A less accurate reduction than that to exactly zero may be sufficient when in the manner shown in FIG. 1 a line blanking pulse having non-defined steep edges is inserted in the signal E through the switch 4, which edges are subsequently given a defined duration. In this case it is favourable for the pulse having the non-defined steep edges occurring in the signal D at the instants $t_2$ and $t_5$ to have these edges occur approximately at the end of the trailing, defined edge and at the beginning of the leading, defined edge which in the signal B, B' corresponds to the instants $t_3 \approx t_2$ and $t_4 \approx t_5$. To realise this, the signal convertor 6 derives the signal B' from the signal A applied thereto and the signal D is derived through the pulse generator 8 included therein.

In the CCIR standard the pulse duration of the line blanking pulse is determined with respect to 50% of the signal amplitude between black level and peakwhite value. For the signal G shown in FIG. 2 it follows that the blanking pulse duration is to be calculated from approximately the middle between the instants $t_0$ and $t_3$ until the middle between the instants $t_4$ and $t_7$, which pulse duration is to be between $12.05 \pm 0.25$ $\mu$s. Since it is recommended to have the pulse edge duration between 200 and 400 ns, approximately 300 ns has been chosen for the duration $T_d$. Consequently the pulse edge in the signal A at the instant $t_0$ must be approximately 150 ns earlier than that of the line blanking pulse prescribed in the standard.

For the RTMA standard there applies that with reference to the signal G of FIG. 2 the duration between leading edge and the trailing edge of the line blanking pulse at 90% of the peak value is smaller than or equal to 18% of the line period and at 10% is larger than or equal to 16.5% of the line period. For the line period of 63.55 $\mu$s there follow periods of 11.44 $\mu$s and 10.49 $\mu$s, respectively. Since the pulse edge periods must be smaller than or equal to 0.4 % of the line period, which is approximately 250 ns, 200 ns may be chosen for the duration $T_d$. By adapting the capacitance of the capacitor 28, the circuit arrangement of FIG. 1 may be rendered suitable in a simple manner for use in one or the other standard with an edge duration of 300 ns and 200 ns, respectively.

With reference to the signals B' and $F' = aF$ of FIG. 2 it has been described herebefore that the signal at the output 19 and the input 12 of FIG. 1 can never be more positive than that applied to the input 10. In the normally occurring image signal variation in the signal F′ between the peakwhite value $+aV_W$ and the black level 0 (in the picture contents before the instant $t_0$ and after the instant $t_7$) the signal comparator circuit 11 is not active due to the choice of the voltage $+V_B$, which is larger than $+aV_W$. When, however, a signal exceeding the peakwhite value $+aV_W$ and the voltage $+V_B$tended to occur in the picture contents, the signal comparator circuit 11 would become active and is then active as a so-called white (signal) clipper.

In FIG. 1 the transistor 42 is of the type having an isolated gate electrode and is used as a variable resistor in the feedback circuit 16. The use of any other variable resistor is possible. In this case it is to be noted that the control characteristic of the variable resistor 42 does not have any influence on the effective reduction of the amplification of the amplifier circuit 15 because the reduction will continue with the aid of the signal comparator circuit 11 to such an extent that the instantaneous signal value at the output 19 and the input 12 is equal to that at the input 10. The linear edges in the signal B′ at the output 10 likewise occur linearly at the output 19 independent of non-linearities in the control characteristic of the variable resistor 42.

Instead of the use of the amplifier circuit 15 having the controlled feedback circuit 16 it might alternatively be possible to use an amplifier 44 whose own amplification is directly controlled.

The circuit arrangement according to FIG. 1 is given for the line blanking pulse introduction in the image signal E with the signal G of FIG. 2 as a result. Starting from the signal G of FIG. 2 the line synchronizing pulse can be inserted therein in the same manner while the front porch and the back porch are to be taken into account. For the line synchronizing pulse introduction it is sufficient to use the signal converter 6 without the pulse generator 8 but with the use of the signal comparator circuit 11 and the amplifier circuit 15. In this case the line synchronizing pulse associated with a television standard is applied to the input 1 and an (inverted) signal corresponding to the signal G shown in FIG. 2 is applied to the input 17 while the different direct voltage values are to be adapted. It will be evident that a simultaneous introduction of blanking and synchronizing pulse is possible by incorporating the line synchronizing pulse in the signal B′ shown in FIG. 2. Since after the foregoing a circuit arrangement can easily be realised, reference is not further made thereto.

The circuit arrangement according to FIG. 1 is described as being used in a television camera. The circuit arrangement can of course be used in any television equipment in which it is desirable or required to have no undefined steep edges for the line blanking (and synchronizing) pulses, but edges having a defined duration. The circuit is especially suitable for performing the described signal processing before applying the signals to signal filters and to video recording equipment using tapes or discs.

What is claimed is:

1. A circuit arrangement for supplying pulses having a defined pulse edge duration in a television image signal, the circuit arrangement comprising a signal converter provided with an input for the supply of a line blanking signal or a line synchronizing signal associated with a television standard, and an output conveying a signal having pulses of defined pulse edge duration, an amplifier circuit having an input for the supply of the image signal and an output which is connected to an input of a signal comparator circuit having a further input coupled to said converter output for the supply of said signal having pulses of the defined pulse edge duration, the output of said signal comparator circuit being connected to a control input of the amplifier circuit for reducing its amplification if the amplitude of the output signal thereof exceeds the amplitude of said signal having pulses of defined pulse edge duration while the image signal is being supplied.

2. A circuit arrangement as claimed in claim 1, wherein the signal converter includes a controlled current source connected to the input for applying a substantially constant current to a capacitor so that the voltage thereacross produces the pulse having the defined pulse edge duration at said converter output.

3. A circuit arrangement as claimed in claim 1, wherein in case of line blanking pulse introduction in the image signal the said input of the amplifier circuit is connected to an output of a signal processing circuit in which a line blanking pulse having nondefined steep pulse edges is added to the image signal.

4. A circuit arrangement as claimed in claim 3, wherein said signal converter includes a second output conveying the said line blanking pulse having nondefined steep pulse edges for the supply to said signal processing circuit.

5. A circuit arrangement as claimed in claim 2, wherein the signal converter is provided with a second output conveying said line blanking pulse having nondefined steep pulse edges for supply to said signal processing circuit and with a pulse generator including a threshold circuit which connects said capacitor to said second output.

6. A circuit arrangement as claimed in claim 1, wherein the signal comparator circuit is formed with two transistors whose emitters are connected together and through a resistor to a voltage and whose bases are each connected to a different one of the said comparator inputs, the collector of the transistor whose base is connected to the input for the supply of the said pulse having the defined pulse edge duration being connected through a resistor to a voltage and furthermore to the output of the signal comparator circuit.

7. A circuit arrangement as claimed in claim 1, wherein the amplifier circuit is formed with an amplifier having a feedback circuit to which the control input is connected.

8. A circuit arrangement as claimed in claim 7, wherein the control input in the feedback circuit is connected to a gate electrode of a transistor of which a source and a drain electrode are arranged in parallel with a resistor present therein.

9. A circuit comprising a signal converter having an input for receiving a sharp edge pulse signal, and an output for providing a gradual edge pulse signal; a variable gain device having a first input for receiving an information signal, a second gain control input, and an output for supplying an output signal; and a signal comparator having a first input coupled to said converter output, a second input coupled to said device output, and an output coupled to said gain control input for reducing the gain of said device when the amplitude of said output signal exceeds the amplitude of said gradual edge pulse signal.

* * * * *